(12) United States Patent
Torii

(10) Patent No.: US 9,596,573 B2
(45) Date of Patent: Mar. 14, 2017

(54) LOCATION INFORMATION SERVICE SYSTEM, LOCATION INFORMATION SERVICE METHOD EMPLOYING ELECTRONIC TAG, PORTABLE INFORMATION TERMINAL, AND TERMINAL PROGRAM

(71) Applicant: TAGCAST, INC., Tokyo (JP)

(72) Inventor: Akatsuki Torii, Tokyo (JP)

(73) Assignee: TAGCAST INC., Tokyo (JP)

( * ) Notice: Subject to any disclaimer, the term of this patent is extended or adjusted under 35 U.S.C. 154(b) by 0 days.

(21) Appl. No.: 14/650,749

(22) PCT Filed: Dec. 12, 2013

(86) PCT No.: PCT/JP2013/083395
§ 371 (c)(1),
(2) Date: Jun. 9, 2015

(87) PCT Pub. No.: WO2014/097968
PCT Pub. Date: Jun. 26, 2014

(65) Prior Publication Data
US 2015/0312725 A1 Oct. 29, 2015

(30) Foreign Application Priority Data
Dec. 21, 2012 (JP) ................. 2012-280018

(51) Int. Cl.
*H04W 24/00* (2009.01)
*H04W 4/04* (2009.01)
(Continued)

(52) U.S. Cl.
CPC .............. *H04W 4/04* (2013.01); *H04H 60/09* (2013.01); *H04M 1/72572* (2013.01);
(Continued)

(58) Field of Classification Search
None
See application file for complete search history.

(56) References Cited

U.S. PATENT DOCUMENTS 8,791,790 B2 * 7/2014 Robertson ........... G07C 9/00111
340/5.61
2004/0203944 A1 10/2004 Huomo et al.
(Continued)

FOREIGN PATENT DOCUMENTS

CN 101576616 A 11/2009
JP 2006-101013 A 4/2006
(Continued)

OTHER PUBLICATIONS

Feb. 29, 2016 Extended European Search Report issued in European Patent Application No. 13866367.9.
(Continued)

*Primary Examiner* — Shantell L Heiber
(74) *Attorney, Agent, or Firm* — Oliff PLC

(57) ABSTRACT

A system enables desired information to be delivered to, or jump into a portable information terminal such as a smartphone which is carried by a user, without relying on GPS or network environment. The system, provided with an electronic tag transmitter, is configured to broadcast the first identification information (management equipment number) such that the application, executed in common by the plurality of the portable information terminal, and a management device configured to receive an inquiry based on the first identification information received by the portable information terminal; transform the first identification information into a second identification information (application identification number) which is to be managed by the portable information terminal; and transmit the second identification information to the portable information terminal having made the inquiry, wherein the portable information (Continued)

terminal is configured to execute the application based on the second identification information.

19 Claims, 10 Drawing Sheets

(51) Int. Cl.
*H04H 60/09* (2008.01)
*H04W 8/02* (2009.01)
*H04W 64/00* (2009.01)
*H04W 72/04* (2009.01)
*H04W 88/02* (2009.01)
*H04W 88/18* (2009.01)
*H04M 1/725* (2006.01)

(52) U.S. Cl.
CPC ............ *H04W 4/043* (2013.01); *H04W 8/02* (2013.01); *H04W 64/003* (2013.01); *H04W 72/042* (2013.01); *H04M 1/7253* (2013.01); *H04W 88/02* (2013.01); *H04W 88/18* (2013.01)

(56) References Cited

U.S. PATENT DOCUMENTS

| | | | | |
|---|---|---|---|---|
| 2005/0082367 | A1* | 4/2005 | Jalkanen | G06Q 20/203 235/451 |
| 2008/0291854 | A1* | 11/2008 | Sim | G06Q 30/02 370/310 |
| 2010/0078475 | A1* | 4/2010 | Lin | B64F 1/366 235/380 |
| 2010/0089996 | A1* | 4/2010 | Koplar | G06F 17/30879 235/375 |
| 2012/0088487 | A1 | 4/2012 | Khan | |
| 2013/0005352 | A1* | 1/2013 | Jones | G07B 15/00 455/456.1 |
| 2013/0143619 | A1* | 6/2013 | Oshime | H04W 88/06 455/552.1 |

FOREIGN PATENT DOCUMENTS

| | | |
|---|---|---|
| JP | 2006-165886 A | 6/2006 |
| JP | 2006-215661 A | 8/2006 |
| JP | 2006-227900 A | 8/2006 |
| JP | 2009-232203 A | 10/2009 |
| JP | 2012-143002 A | 7/2012 |
| JP | 2014-106562 A | 6/2014 |

OTHER PUBLICATIONS

Aug. 20, 2014 Office Action issued in Japanese Patent Application No. 2014-528783.
Jan. 14, 2015 Office Action issued in Japanese Patent Application No. 2014-231095.
Mar. 14, 2016 Office Action issued in Chinese Patent Application No. 201380067228.6.
Sep. 6, 2016 Office Action issued in Chinese Patent Application No. 201380067228.6.

\* cited by examiner (a)

| management equipment number | application identification information | facility information |
|---|---|---|

(b)

| identifier | encoding pattern | management equipment No. | check code |
|---|---|---|---|
| 1 | 1 | 13 | 1 |

16 bytes (a)

(b)

(a)

(b)

LOCATION INFORMATION SERVICE SYSTEM, LOCATION INFORMATION SERVICE METHOD EMPLOYING ELECTRONIC TAG, PORTABLE INFORMATION TERMINAL, AND TERMINAL PROGRAM

TECHNICAL FIELD

The present invention relates to a location information service system, a location information service method employing an electronic tag, a portable information terminal, and a terminal program, which enable a desired information to be delivered to or jump into a portable information terminal, such as a smartphone which is carried by a user.

BACKGROUND ART

Conventionally, there have been known a check-in service that information on near commercial facilities can be achieved based on a location information service which is provided by a business operator. The information achieved with this check-in service also includes a discount or privilege item such as a coupon and etc. besides mere store information. This location information service is performed by specifying the location of a user carrying a portable information terminal via a network environment such as GPS (Global Positioning System) and Wi-Fi (registered trademark).

Moreover, for example, Patent Document 1 discloses an information providing system, which allows information around a station to be sent to a portable information terminal at the time of the entrance and exit of an automatic ticket gate, using the portable information terminal with a radio tag chip, carried by a user and a reader writer connected to a server mounted in the automatic ticket gate. Specifically, when the user passes the ticket gate of the station, information which would be necessary to the user on the street, including a map of the station and neighborhood, a department store, a coupon, and etc. is transmitted to, and displayed on the portable information terminal.

CITATION LIST

Patent Literature

[PLT 1]
Japanese patent publication No. 2005-242686 (A)

SUMMARY OF INVENTION

Technical Problem

However, in the above-mentioned conventional check-in service, when achieving location information using GPS, it is hard to capture GPS radio waves in the underground center or inside building, and the user thus fails to achieve necessary information when needed. Moreover, when a network environment such as Wi-Fi (registered trademark) and etc. is used, cost for establishment and maintenance of the associated system increases.

The present invention is provided for solving the aforementioned problems or drawbacks. The objective of the present invention is to provide a location information service system, a location information service method employing an electronic tag, a portable information terminal, and a terminal program, which enable desired information to be delivered to, or jump into a portable information terminal such as a smartphone which is carried by a user, without relying on GPS or network environment.

Solution to Problem

As a first aspect of the present invention, there is provided a location information service system. The location information service system is provided with at least one electronic tag transmitter configured to transmit radio waves containing a first identification information, and at least one portable information terminal configured to receive the first identification information and execute an application specified by the first identification information. The portable information terminal measures a radio wave intensity of the radio waves transmitted by the electronic tag transmitter, and executes the application varying depending on the radio wave intensity.

In the location information service system, in the event that there is a plurality of the portable information terminals, the electronic tag transmitter is configured to broadcast the first identification information such that the application which is executed in common by the plurality of the portable information terminals is specified.

The location information service system may be further provided with a management device. The management device is configured to receive an inquiry based on the first identification information received by the portable information terminal; transform the first identification information into a second identification information which is to be managed by the portable information terminal; and transmit the second identification information to the portable information terminal having made the inquiry. The portable information terminal is configured to execute the application based on the second identification information.

In the location information service system, the portable information terminal may be provided with a memory in which a correspondence table between the first identification information and the second identification information transmitted by the management device is memorized. The corresponding table may be updated at an arbitrary timing.

In the location information service system, the electronic tag transmitter may encode the first identification information in at least one encoding pattern, and add a type of the encoding pattern to the first identification information encoded to transmit the encoded first identification information with the type of the encoding pattern added.

In the location information service system, the electronic tag transmitter may basically transmit the first identification information at a cycle of n second(s). A cycle of m second(s) shifted (n>m) may be randomly inserted to the cycle of n second(s).

As a second aspect of the present invention, there is provided a location information service system, which is provided with:
  at least one electronic tag transmitter configured to transmit radio waves containing a first identification information,
  at least one portable information terminal configured to receive the first identification information and execute an application specified by the first identification information,
  a customer management terminal mounted in a facility having the electronic tag transmitter mounted therein. When a check-in application is run, and the radio waves received from the electronic tag transmitter reach a predetermined radio wave intensity, the portable information terminal transmits an information on the radio wave intensity to the customer management terminal. The customer management terminal makes a check-in determination based on the information on the radio wave intensity: achieves a personal information from the portable information terminal: and displays the personal information on a screen.

In the location information service system, upon receiving a request from the portable information terminal, the customer management terminal may achieve an information associated with an electronic payment from the portable information terminal; add the information associated with the electronic payment to the personal information obtained by the check-in determination; and execute an electronic payment processing.

As a third aspect of the present invention, there is provided a location information service system, which is provided with:

- at least one electronic tag transmitter configured to transmit radio waves containing a first identification information,
- at least one portable information terminal configured to receive the first identification information and execute an application specified by the first identification information,
- a management device, the management device being configured to receive an inquiry based on the first identification information received by the portable information terminal; transform the first identification information into a second identification information which is to be managed by the portable information terminal; and transmit the second identification to the portable information terminal having made the inquiry, and
- a facility management device connected via a network to the portable information terminal, and run and managed by the facility. The portable information terminal is configured to execute the application based on the second identification information. When a check-in application is run, and the radio waves received from the electronic tag transmitter reach a predetermined radio wave intensity, an information on the radio wave intensity is transmitted to the facility management device. The facility management device makes a check-in determination based on the information on the radio wave intensity; achieves a personal information specified by the first identification information and the second identification information from the management device; and displays the personal information on a screen.

In the location information service system, upon receiving a request from the portable information terminal, the facility management device may communicate with the management device; achieve an information associated with an electronic payment from the management device; add the information associated with the electronic payment to the personal information obtained by the check-in determination, and execute an electronic payment processing.

The location information service system may be further provided with a facility management device connected via a network to the portable information terminal, and run and managed by the facility. When a routing assistance application is run, and a facility as a destination is set, the portable information terminal achieves an information associated with the facility from the facility management device; displays on a screen an information associated with the facility corresponding to a current location in line with an advancing direction; determines a direction to the destination based on a radio wave intensity of the radio waves which are transmitted by a plurality of the electronic tag transmitters; and displays a routing assistance to the destination on a screen.

In the location information service system, upon receiving a request for switching the screen, the portable information terminal may switch the screen from the routing assistance display mode to an augmented reality display mode.

As a fourth aspect of the present invention, there is provided a location information service method employing an electronic tag in a location information service system, which is provided with at least one electronic tag transmitter configured to transmit radio waves containing a first identification information, a management device run and managed by a location information service-providing business operator, and a plurality of portable information terminals connected via a network to the management device and configured to receive the first identification information and execute an application specified by the first identification information. The method includes the steps of:

- the electronic tag transmitter's broadcasting the first identification information via radio waves, the first identification information specifying an application which is executed in common by the portable information terminal,
- the management device's receiving an inquiry based on the first identification information which is received by the portable information terminal; transforming the first identification information into a second identification information which is to be managed by the portable information terminal; and transmitting the second identification information to the portable information terminal having made the inquiry, and
- the portable information terminal's executing the application based on the second identification information. The portable information terminal measures a radio wave intensity of the radio waves transmitted by the electronic tag transmitter, and executes the application varying depending on the radio wave intensity.

As a fifth aspect of the present invention, there is provided a portable information terminal connected via a network to a management device. The portable information terminal includes:

- an identification information recognizing unit receiving and recognizing a first identification information which specifies an application that is executed in common by at least one portable information terminal and is broadcast via radio waves by an electronic tag transmitter configured to transmit radio waves containing the first identification information, and
- an application execution control unit querying the management device based on the first identification information identified; achieving a second identification information, into which the management device transforms the first identification information, and which is transmitted by the management device; and executing a corresponding application based on the second identification information achieved. The portable information terminal measures a radio wave intensity of the radio waves transmitted by the electronic tag transmitter, and executes the application varying depending on the radio wave intensity.

As a sixth aspect of the present invention, there is provided a terminal program, which causes a computer of a portable information terminal connected to via a network to a management device to perform:

a processing of receiving and recognizing a first identification information which specifies an application that is executed in common by at least one portable information terminal and is broadcast via radio waves by an electronic tag transmitter configured to transmit radio waves containing the first identification information, and a processing of querying the management device based on the first identification information recognized; receiving a second identification information, into which the management device transforms the first identification information and which is transmitted by the management device; and executing a corresponding application based on the second identification information received. The portable information terminal measures a radio wave intensity of the radio waves transmitted by the electronic tag transmitter, and executes the application varying depending on the radio wave intensity.

As a seventh aspect of the present invention, there is provided a location information service method employing an electronic tag in a location information service system, which is provided with at least one electronic tag transmitter configured to transmit radio waves containing a first identification information, a management device run and managed by a location information service-providing business operator, and a plurality of portable information terminals connected via a network to the management device and configured to receive the first identification information and execute an application specified by the first identification information. The method includes the steps of:

the electronic tag transmitter's broadcasting the first identification information via radio waves, the first identification information specifying an application which is executed in common by the portable information terminal, the management device's receiving an inquiry based on the first identification information which is received by the portable information terminal; transforming the first identification information into a second identification information which is to be managed by the portable information terminal; and transmitting the second identification information to the portable information terminal having made the inquiry, and the portable information terminal's executing the application based on the second identification information. When a check-in application as the application is run, and the radio waves received from the electronic tag transmitter reach a predetermined radio wave intensity, the portable information terminal transmits an information on the radio wave intensity to the customer management terminal. The customer management terminal makes a check-in determination based on the information on the radio wave intensity; achieves a personal information from the portable information terminal; and displays the personal information on a screen.

As a eighth aspect of the present invention, there is provided a portable information terminal connected via a network to a management device. The portable information terminal includes:

an identification information recognizing unit receiving and recognizing a first identification information which specifies an application that is executed in common by at least one portable information terminal and is broadcast via radio waves by an electronic tag transmitter configured to transmit radio waves containing the first identification information, and an application execution control unit querying the management device based on the first identification information identified; achieving a second identification information, into which the management device transforms the first identification information, and which is transmitted by the management device; and executing a corresponding application based on the second identification information achieved, When a check-in application as the application is run, and the radio waves received from the electronic tag transmitter reach a predetermined radio wave intensity, the portable information terminal transmits an information on the radio wave intensity to the customer management terminal. The customer management terminal makes a check-in determination based on the information on the radio wave intensity; achieves a personal information from the portable information terminal; and displays the personal information on a screen.

As a ninth aspect of the present invention, there is provided a terminal program, which causes a computer of a portable information terminal connected to via a network to a management device to perform:

a processing of receiving and recognizing a first identification information which specifies an application that is executed in common by at least one portable information terminal and is broadcast via radio waves by an electronic tag transmitter configured to transmit radio waves containing the first identification information, and a processing of querying the management device based on the first identification information recognized; receiving a second identification information, into which the management device transforms the first identification information and which is transmitted by the management device; and executing a corresponding application based on the second identification information received. When a check-in application as the application is run, and the radio waves received from the electronic tag transmitter reach a predetermined radio wave intensity, the portable information terminal transmits an information on the radio wave intensity to the customer management terminal. The customer management terminal makes a check-in determination based on the information on the radio wave intensity; achieves a personal information from the portable information terminal; and displays the personal information on a screen.

As a tenth aspect of the present invention, there is provided a location information service system. The location information service system is provided with at least one electronic tag transmitter configured to transmit radio waves containing a first identification information, and a portable information terminal configured to receive the first identification information to execute a terminal program based on the first identification information, and measure a radio wave intensity of the radio waves transmitted by the electronic tag transmitter to switch between a first screen mode and a second screen mode based on the radio wave intensity. The first screen mode and the second screen mode are displayed in regard to a first service and a second service respectively.

In the afore-mentioned configuration, the location information service system is further provided with a management device configured to manage a location information of the portable information terminal. The portable information terminal queries the management device based on the first identification information received from the electronic tag transmitter, and achieves, from the management device, a second identification information into which the management device transforms the first identification.

As a eleventh aspect of the present invention, there is provided a location information service method employing an electronic tag in a location information service system, which is provided with at least one electronic tag transmitter configured to transmit radio waves containing a first identification information, and a portable information terminal connected via a network to a management device managing a location information, and configured to receive the first identification information and execute a terminal program based on the first identification information. The method includes the steps of:

the management device's receiving an inquiry based on the first identification information which is received by the portable information terminal; transforming the first identification information into a second identification information which is to be managed by the portable information terminal; and transmitting the second identification information to the portable information terminal having made the inquiry, and the portable information terminal's executing the terminal program based on the second identification information. The portable information terminal measures a radio wave intensity of the radio waves transmitted by the electronic tag transmitter to switch between a first screen mode and a second screen mode based on the radio wave intensity.

As a twelfth aspect of the present invention, there is provide a portable information terminal connected via a network to a management device. The portable information terminal is provided with:

an identification information recognizing unit receiving and recognizing a first identification information for executing a terminal program from at least one electronic tag transmitter configured to transmit radio waves containing the first identification information, and a control unit querying the management device based on the first identification information recognized; achieving a second identification information, into which the management device transforms the first identification information, and which is transmitted by the management device; and executing the terminal program based on the second identification information achieved. The control unit measures a radio wave intensity of the radio waves transmitted by the electronic tag transmitter to switch between a first screen mode and a second screen mode based on the radio wave intensity.

As a thirteenth aspect of the present invention there is provided a terminal program, which causes a computer of a portable information terminal connected to via a network to a management device to perform:

a processing of receiving and recognizing a first identification information for executing a terminal program from at least one electronic tag transmitter configured to transmit radio waves containing the first identification information, a processing of querying the management device based on the first identification information recognized; receiving a second identification information, into which the management device transforms the first identification information, and which is transmitted by the management device; and executing the terminal program based on the second identification information received, and a processing of measuring a radio wave intensity of the radio waves transmitted by the electronic tag transmitter to switch between a first screen mode and a second screen mode based on the radio wave intensity.

Advantageous Effects of Invention

According to the present invention, a location information service system, a location information service method employing an electronic tag, a portable information terminal, and a terminal program can be provided such that a desired information is delivered to or jump into a portable information terminal such as a smartphone carried by a user, without relying on GPS or a network environment.

DESCRIPTION OF EMBODIMENTS (Configuration of the First Embodiment)

An embodiment of the present invention will be hereinafter described in detail with reference to the accompanying drawings.

Figures 1, 2:
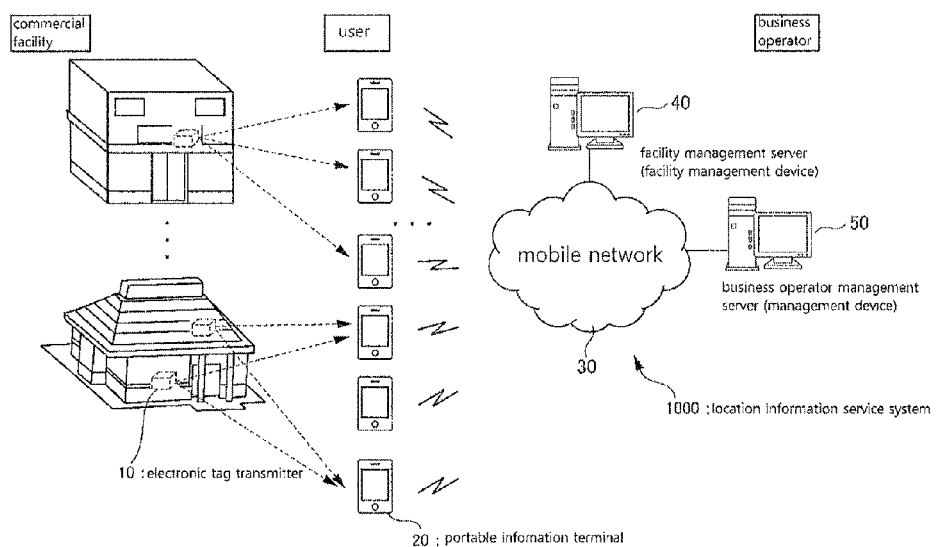
FIG. 1 shows a configuration of a location information service system in accordance with a first embodiment of the present invention.
FIG. 2 shows an exemplary data format of an identification information transmitted by an electronic tag transmitter as shown in FIG. 1, and an exemplary data configuration of DB which is owned by a management device.

Referring to FIG. 1, a location information service system 1000 in accordance with the first embodiment of the present invention is provided with one or more electronic tag transmitter 10 mounted in an arbitrary location of a commercial facility (hereinafter referred to simply as a "facility") such as a restaurant, a hotel, and a store, a management device (hereinafter referred to simply as a "business operator-management server 50") which is managed and run by a location information service-providing business operator (hereinafter referred to simply as a "business operator"), and at least one portable information terminal 20 such as a smartphone connected via a network (i.e., a mobile network 30) to the business operator-managed server 50. Moreover, a facility management device (i.e., facility management server 40) which is managed and run by the commercial facility is also connected to the mobile network 30.

In the above-mentioned configuration, the electronic tag transmitter 10 broadcasts a first identification information (i.e., a management equipment number which is described below) via radio waves such that a common application which is respectively executed by a plurality of portable information terminals 20 is specified. In this configuration, the first identification information (i.e., the management equipment number) is a unique number given to each electronic tag transmitter 10. The business operator management server 50 receives an inquiry (query) based on the first identification information which the portable information terminal 20 receives, and indexes database housed therein, thereby transforming the first identification information into a second identification information (i.e., an application identification information which is described below) which is to be managed by the portable information terminal 20, and transmitting the second identification information to the portable information terminal 20 in which the inquiry has been made. Subsequently, the portable information terminal 20 executes the application based on the second identification information, and enjoys the facility information or service distributed by the facility management server 40.

An exemplary data configuration of database which is housed in the business operator management server 50 is shown in FIG. 2(*a*). In the database, the application identification information, which can be identified by the common application which is respectively executed by the plurality of the portable information terminal 20, and facility information are stored in the management equipment number uniquely imparted to each of the electronic tag transmitter 10 mounted in the commercial facility. In addition, the facility information may be a guidance information including a name, an address and URL (Uniform Resource Locator) of the facility.

Figure 3:
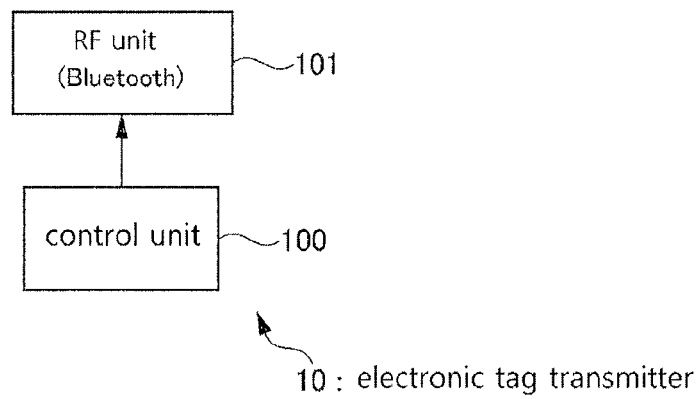
FIG. 3 is a block diagram showing a configuration of an electronic tag transmitter in accordance with a first embodiment of the present invention.

Referring to FIG. 3, the electronic tag transmitter 10 is provided with a control unit 100 and a RF (Radio Frequency) unit 101. RF unit 101 is provided with a signal source (not shown), a modulation circuit, and a power amplifier, and is a high-frequency-wave circuit generating high-frequency wave energy for the radio waves generation. In the embodiment, radio waves which are generated under the control of the control unit 100 are transmitted to Bluetooth (registered trademark)-equipped device (i.e., the portable information terminal 20) located within a radius of from 10 m to 100 m, using the frequency of a 2.4 GHz bandwidth. In the embodiment, a unidirectional transmission based on Bluetooth 4.0, which can be driven for several years only with one button cell, is adopted.

The control unit 100 broadcasts the management equipment number, which specifies the (common) application which is executed in common by the portable information terminals 20. At this time, the control unit 100 encodes the management equipment number in one or more encoding pattern, and also transmits an information indicating the type of the encoding pattern in addition to the encoded management equipment number. For this reason, the control unit 100 performs a control such that the first identification information consisting of data format as shown in FIG. 2(*b*) is superposed on the radio waves generated by the RF unit 101 and then transmitted.

According to FIG. 2(*b*), the first identification information consists of 16 bytes of data. That is, a identifier indicating an electronic tag is assigned to a leading one byte, an encoding format indicating the type of encoding pattern is assigned to the next one byte, a unique management equipment number of the electronic tag transmitter 10 is assigned to the next 13 bytes, and a check-in digit is assigned to the last one byte. In addition, due to identifier information, the 13 bytes area of the management equipment number can be used as data area, which may be effective in a case, for example, where there is an external interface.

In addition, the control unit 100 is configured that the first identification information containing the management equipment number is transmitted in a cycle of n seconds and a cycle of m seconds (n>m) shifted is randomly inserted to the cycle of n seconds. This is because if a plurality of electronic tag transmitters 10 transmits radio waves simultaneously, the portable information terminal 20 may process data from one electronic tag transmitter 10 but cannot process data from the other electronic tag transmitter(s) 10. In other words, in a case of Bluetooth (Registered trademark), when collision (i.e., collision of access) occurring, previously received data may be preferentially processed, and even slightly delayed data cannot be processed. For this reason, a cycle of, for example, from 0.5 to 1 (m) second shifted is occasionally inserted to a transmission cycle of two (n) seconds, thereby avoiding a risk that data transmitted by any of the plurality of electronic tag transmitters 10, which transmits radio wave simultaneously, cannot be processed.

In order to prevent illegal use by interception the data transmitted by the electronic tag transmitter 10 can be periodically changed. For this purpose, a risk of interception can be reduced by periodically and automatically changing the encoding pattern.

Figure 4:
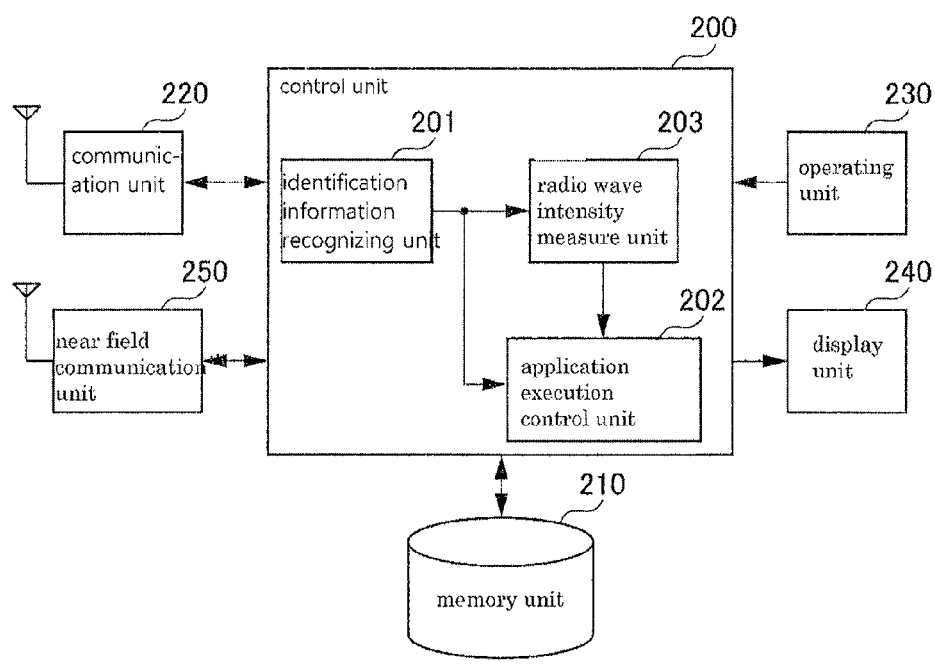
FIG. 4 is a block diagram showing a configuration of a portable information terminal in accordance with a first embodiment of the present invention.

FIG. 4 shows the configuration of the portable information terminal 20. Referring to FIG. 4, the portable information terminal 20 is provided with a control unit 20, a memory unit 210, a communication unit 220, an operating unit 230, a display unit 240, and a near field communication unit 250.

The control unit 200 may be provided with, for example, a microprocessor, and configured to sequentially read and execute a terminal program stored in a program area of the memory unit 210, thereby achieving and recognizing the first identification information (i.e., management equipment number) from the electronic tag transmitter 10, and functioning as the portable information terminal 20, which executes the application specified by the management equipment number as recognized.

For the above reasons, if the function of the terminal program which is executed by the control unit 200 is represented by a block, there are provided an identification information-recognizing unit 201 achieving and recognizing the first identification information (i.e., management equipment number), which specifies the (common) application that is executed in common by one or more portable information terminal 20 and is transmitted (i.e., broadcast) via radio waves by the electronic tag transmitter 10 mounted in an arbitrary location of the commercial facility, and an application execution control unit 202 querying the business operator management server 50 based on the first identification information as recognized, receiving the second identification information (i.e., the application identification information) into which the business operator management device 50 transforms the first identification information and which is transmitted by the business operator management server 50, and executing the corresponding application based on the second identification information as received. The control unit 200 may measure radio wave intensity of the radio waves received from the electronic tag transmitter 10, and execute application which varies depending on the radio wave intensity of the radio waves as measured. Accordingly, it may be considered that the control unit 200 further has a radio wave intensity measure unit 203 configured to measure the radio wave intensity or RSSI (received signal strength indication).

In addition to the program area in which the terminal program in accordance with the embodiment of the present invention is stored, the memory unit 210 has an operation area and VRAM (video RAM) area assigned thereto and memorized therein. The terminal program stored in the program area has a procedure of receiving the first identification information (i.e., management equipment number) specifying the (common) application which is executed in common by one or more portable information terminal 20 and is broadcast via radio waves by the electronic tag transmitter 10 mounted in the arbitrary location of the commercial facility, and a procedure of querying the business operator management server 50 based on the management equipment number, receiving the second identification information (i.e., the application identification information) into which the business operator management device 50 transforms the first identification information and which is transmitted by the business operator management server 50, and executing the corresponding application based on the second identification information as received.

A variety of data created during the execution of the terminal program is stored in the operation area. Such data include, for example, a correspondence table between the management equipment number and the application identification information transmitted by the business operator management server 50. The correspondence table is updated by the control unit 200, for example, whenever an access to the business operator management server 50 occurs. In addition, the timing of updating is arbitrary. In the VRAM area, a screen information for effective screen of the display unit 240 out of information to be displayed, stored in the operation area is cut, delivered, and stored. Furthermore, for example, a semiconductor memory element, a magnetic memory element, or an optical memory element is mounted as the memory unit 210.

The communication unit 220 achieves a radio communication system, and performs radio communication with a base station (not shown) connected to the mobile network 30, thereby transmitting and receiving a variety of data, which includes voice data during a voice call, mail data during sending or receiving a mail, web page data during Web (World Wide Web) browsing, and etc. The communication unit 220 communicates with the facility management server 40 or the business operator management server 50 via the mobile network 30 in accordance with a protocol based on, for example, TCP/IP (Transmission Control Protocol/Internet Protocol).

The operating unit 230 has key switches, to which various functions are assigned, and includes, for example, a power-source key, a speaking key, a number key, a character key, direction key (left, right, top and bottom), a determination key, a calling key, and etc. When the key switches are operated by a user, the operating unit 230 creates a signal corresponding to the operation, and outputs the signal as the user's indication at the control unit 200. The display unit 240 may be manufacture by using, for example, LCD (Liquid Crystal Display) or organic EL (Electro-Luminescence), which consists of a number of pixels (the combination of multiple color light emitting elements) arranged in every direction. The display unit 240 displays information, which is created by the control unit 200, and written (recorded) in a predetermined area (VRAM area) of the memory unit 210.

Figure 6:
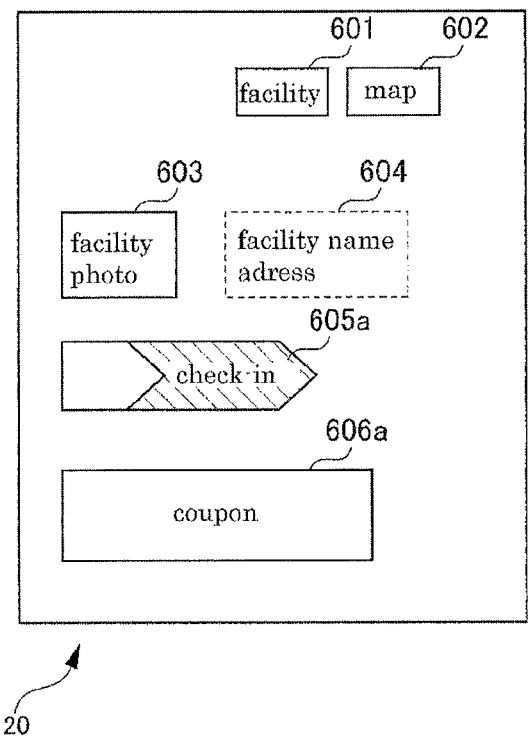
FIG. 6 shows a screen configuration of a portable information terminal in accordance with a first embodiment of the present invention.
Figure 6:
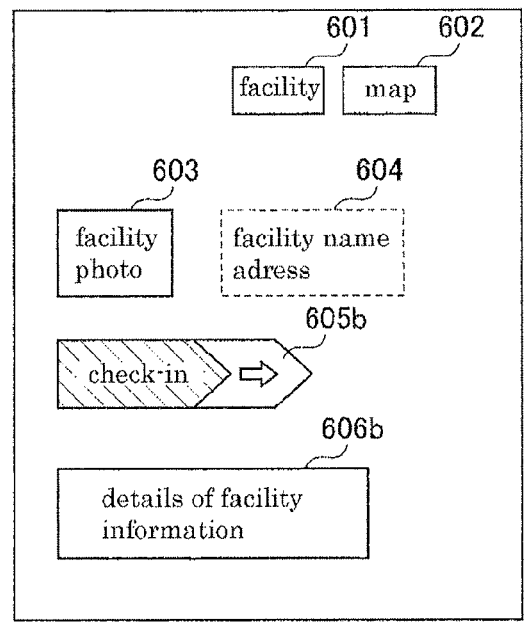

In addition, the afore-mentioned operating unit 230 and the display unit 240 may be realized by a touch panel. In this case, an application can be run by user's selection (operation) out of application icons displayed on the touch panel, and as a result of executing the application, an image as shown in, for example, FIGS. 6(*a*) and 6(*b*) can be displayed, which will hereinafter be described in detail.

The near field communication unit 250 receives the radio waves transmitted by the electronic tag transmitter 10, extracts the first identification information superposed on the radio waves, and delivers the extracted, superposed first identification information to the control unit 200. The near field communication unit 250 performs communication based on Bluetooth (registered trademark). Originally, 2.4 GHz bandwidth is divided into seventy nine frequency channels. While frequency hopping in which frequency in use is randomly modified, the near field communication unit 250 can conduct a bidirectional communication at maximum 24 bps with other Bluetooth (Registered Trademark) device (i.e., portable information terminal 20) located within a radius of from 10 m to 100 m. However, in the embodiment the near field communication unit 250 having the same specification is used only for unidirectional communication of receiving radio waves from the electronic tag transmitter 10.

(Operation of the First Embodiment)

Hereinafter, the operation of the portable information terminal 20 in accordance with the embodiment is explained with reference to a flow chart of FIG. 5.

When the portable information terminal 20 is powered on, the near field communication unit 250 begins to monitor the radio waves transmitted by the electronic tag transmitter 10 (Step S101). If the near field communication unit 250 detects the reception of the radio waves ("Yes" in Step S101), it delivers the first identification information superposed on the radio waves and consisting of the data format as shown in FIG. 2(*b*) to the control unit 200. In the control unit 200, if the identification information recognizing unit 201 achieves the first identification information and recognizes an electronic tag by referring to the identifier indicated in the leading byte ("Yes" in Step S102), the following (subsequent) management equipment number is decoded based on the encoding pattern defined by encoding format and delivered to the application execution control unit 202 (Step S103).

The application execution control unit 202 runs the communication unit 220, connects via the mobile network 30 to the business operator management server 50, and makes a query (inquiry) about the application identification information based on the decoded management equipment number (Step S104). The business operator management server 50 having received the query indexes the database, the data format of which is shown in FIG. 2(*a*), by using the decoded management equipment number as a key. As a result, the decoded management equipment number is transformed into the application identification information unique to the portable information terminal 20 having made such a request, and the corresponding application identification information is transmitted via the mobile network 30 to the portable information terminal 20 having made such the request.

If the application execution control unit 202 achieves the application identification information received via the communication unit 220 (Step S105, "Yes"), the application identification information is temporarily stored in a predetermined area of the memory unit 210 (Step S106). In addition, the radio wave intensity measure unit 203 always measures RSSI of the radio waves received in the step S101, and delivers the measurement to the application execution control unit 202. Upon detecting the user's selection operation of the operating unit 230 out of the application icons displayed on the display unit 240 based on the previously received application identification information, so-called running operation of the application (Step S107, "Yes"), the application execution control unit 202 compares RSSI of the radio waves as measured by the radio wave intensity measure unit 203 with a predetermined RSSI as a threshold (Step S108).

If the RSSI of the received radio waves is the predetermined threshold or above (Step S108, "Yes"), the application execution control unit 202 creates the screen information, for example, as shown in FIG. 6(a), and writes the screen information in the VRAM area of the memory unit 210. Subsequently, the display unit 240 reads the screen information written in the memory unit 210 in synchronization with the timing of display device's displaying, thereby displaying a coupon-attached page distributed by the facility management server 40 (Step S109). On the other hand, if the RSSI of the received radio waves is below the predetermined threshold (Step S108, "No"), the application execution unit 202 creates the screen information, for example, as shown in FIG. 6(b) and writes the screen information in the VRAM area of the memory unit 210. Subsequently, the display unit 240 reads the screen information written in the memory unit 210 in synchronization with the timing of display device's displaying, thereby displaying a store information page as achieved (Step S110).

FIG. 6(a) and FIG. 6(b) show exemplary screen structures of the portable information terminal 20, created by the application execution control unit 202 and displayed by the display unit 240. FIG. 6(a) shows a coupon-attached store information page, and FIG. 6(b) shows a store information page. Both of the screen structures have display areas of a "facility" button 601 indicating the display of information relating to a commercial facility such as a store, and etc., "map" button 602 indicating the display of a guidance map of the commercial facility, a photograph of the commercial facility 603, a bibliographic item 604 such as a name, an address and etc. of the commercial facility, an elevator icon 605a (605b) displaying the relative position between a user and the facility, and detailed information (606) associated with the facility. These screen structures are only different from each other in the display pattern of the elevator icon 605a (605b) and presence or absence of a coupon displaying area (607) in which a coupon distributed by the facility management server 40 is displayed. The coupon-attached store information page shown in FIG. 6(a) has the coupon displaying area (607), but the store information page shown in FIG. 6(b) does not have such a coupon displaying area (607).

In this embodiment, when a user is located, for example, within 3 m distance from a store (i.e., after entering the store) and a corresponding RSSI is measured, the elevator icon 605a and the coupon-attached store information page 606a as shown in FIG. 6(a) are displayed. On the other hand, when a user is located within a distance of 3 m to 10 m from the store (i.e., before entering the store) and a corresponding RSSI is measured, the elevator icon 605b and the store information page 606b as shown in FIG. 6(b) are displayed. The threshold can be preliminarily set based on the above concept.

(Application Case Example in the First Embodiment)

Hereinafter, an application case example of the location information service system 1000 in accordance with the first embodiment of the present invention will be explained.

An example of using the location information service system 1000 in accordance with the embodiment of the present invention in a restaurant, a hotel and etc. is explained.

Figure 7:
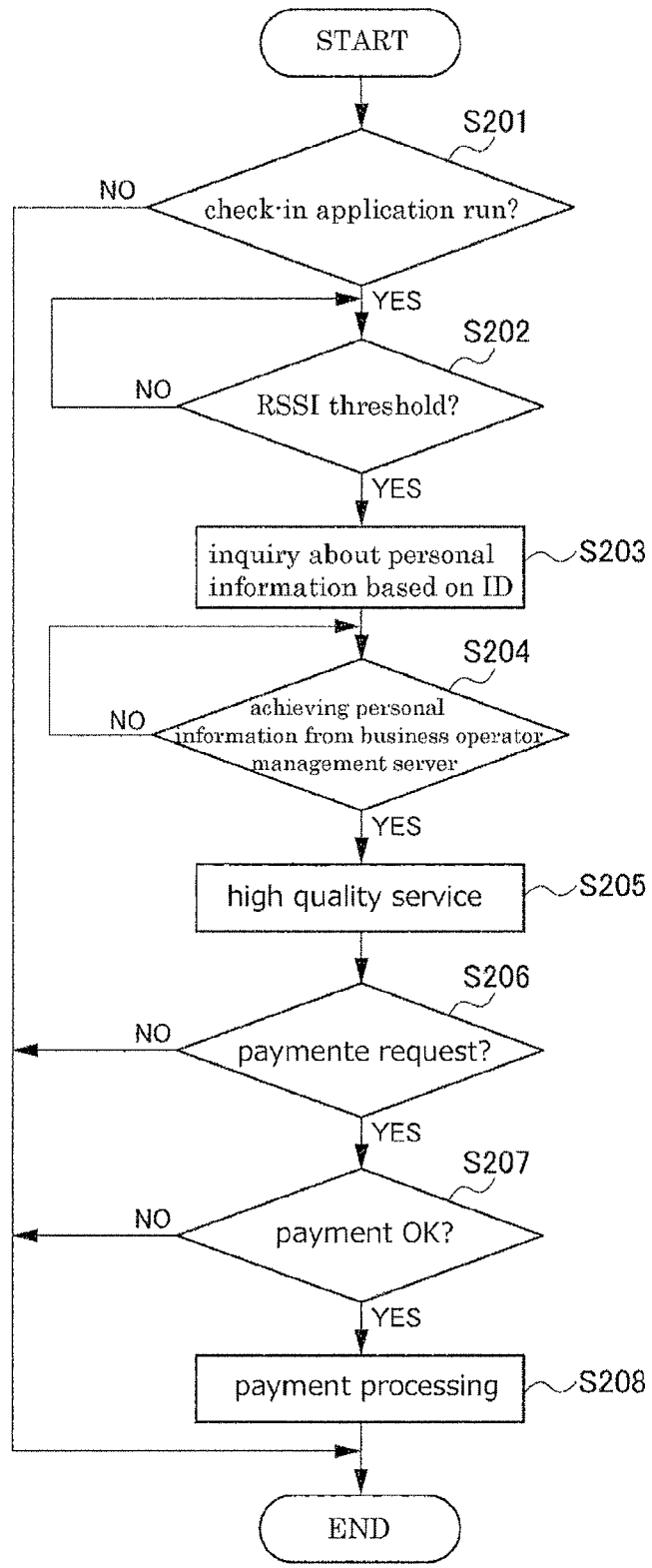
FIG. 7 shows a procedure of a check-in application and a payment application using a location information service system in accordance with a first embodiment of the present invention.
Figure 8:
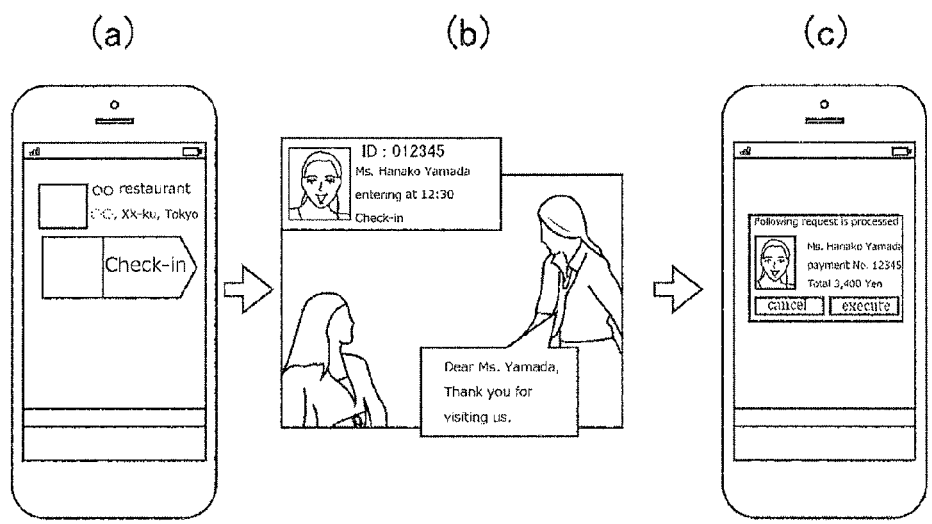
FIG. 8 shows an exemplary screen created by a check-in application and a payment application in accordance with the present invention.

FIG. 7 shows a procedure of a check-in application and a payment application using the location information service system in accordance with one embodiment the present invention. FIG. 8 shows an exemplary screen created by a check-in application and a payment application in accordance with one embodiment of the present invention.

The term "check-in" as used in the specification means that a customer comes into or enters a facility. Furthermore, a personal information of a user who carries the portable information terminal 20 may be preliminarily registered with the business operator management server 50. In addition, the personal information may be registered with a server owned by a fiduciary institution (not shown). For example, as shown in FIG. 8(a), the user (i.e., customer) carrying the portable information terminal 20 preliminarily runs the check-in application before entering a store (Step S201). The application execution control unit 202 compares RSSI of the radio waves as measured by the radio wave intensity measure unit 203 with a predetermined RSSI as a threshold. If the RSSI of the received radio waves is the predetermined threshold or above, the application execution control unit 202 transmits the radio wave information via the predetermined network to the facility management device 40. Based on the radio wave information received, the facility management device 40 determines or judges that the customer came into or entered the store (Step S202). Subsequently, the facility management device 40 queries the business operator management server 50 about the personal information (e. g., ID, a name, a head-and-shoulders photo) (Step S203). The business operator management server 50 specifies the personal information based on the first identification information received by the portable information terminal 20 carried by the customer, and the second identification information into which the business operator management device 50 transforms the first identification information and which is transmitted by the business operator management server 50, and transmits the personal information to the facility management server 40 (Step S204). The terminal of the facility management server 40 having received the personal information displays, for example, "ID: 012345, Ms. Hanako Yamada, entering (the store) at 12:30, Check-in" as shown in FIG. 8(b). Since a sales staff having checked the personal information can know the customer's name and face before meeting or servicing the customer, he/she provides the customer with a high quality service (i.e., executive service) such as talking to the customer with the name (Step S205).

Next, a procedure of payment will be described. The user operates the portable information terminal 20, and issues a request for payment processing (Step S206). The application execution control unit 202 inquires the memory unit 210 of the portable information terminal 20 about the personal information as preliminarily registered (for example, a name, a credit number) and a personal information achieved from the business operator management server 50 at the time of check-in. If the former personal information corresponds to the latter personal information, a certification of payment processing is performed (step S207). Upon receiving a request from the portable information terminal 20, the facility management device 40 performs communication with the business operator management server 50, achieves information associated with an electronic payment from the business operator management server 50, and adds the information associated with the electronic payment to the personal information obtained by check-in determination (judgment) to calculate a total amount spent from the check-in until the payment, and transmit the result of the calculation to the portable information terminal 20. For example, as shown in FIG. 8(*c*), payment-associated content (screen) is displayed on the portable information terminal 20 of the user. The user having confirmed or checked the payment-associated content inserts a password associated with credit payment, and presses a button of "execute", thereby performing the payment processing (Step S208).

In accordance with the afore-mentioned application, check-in determination (judgment) and payment are performed using the electronic tag transmitter 10. Accordingly, it can be determined that the customer will enter the store before check-in, and a sales staff can know a name and face of the customer in advance, thereby providing the customer with a high quality service. Furthermore, in accordance with the afore-mentioned application, the personal information memorized in the portable information terminal 20 carried by the user is referred to the personal information registered with the business operator management server 50. Accordingly, the personal information of the customer is specified, thereby allowing for smooth payment without any presentation of cash or a credit card.

Figure 9:
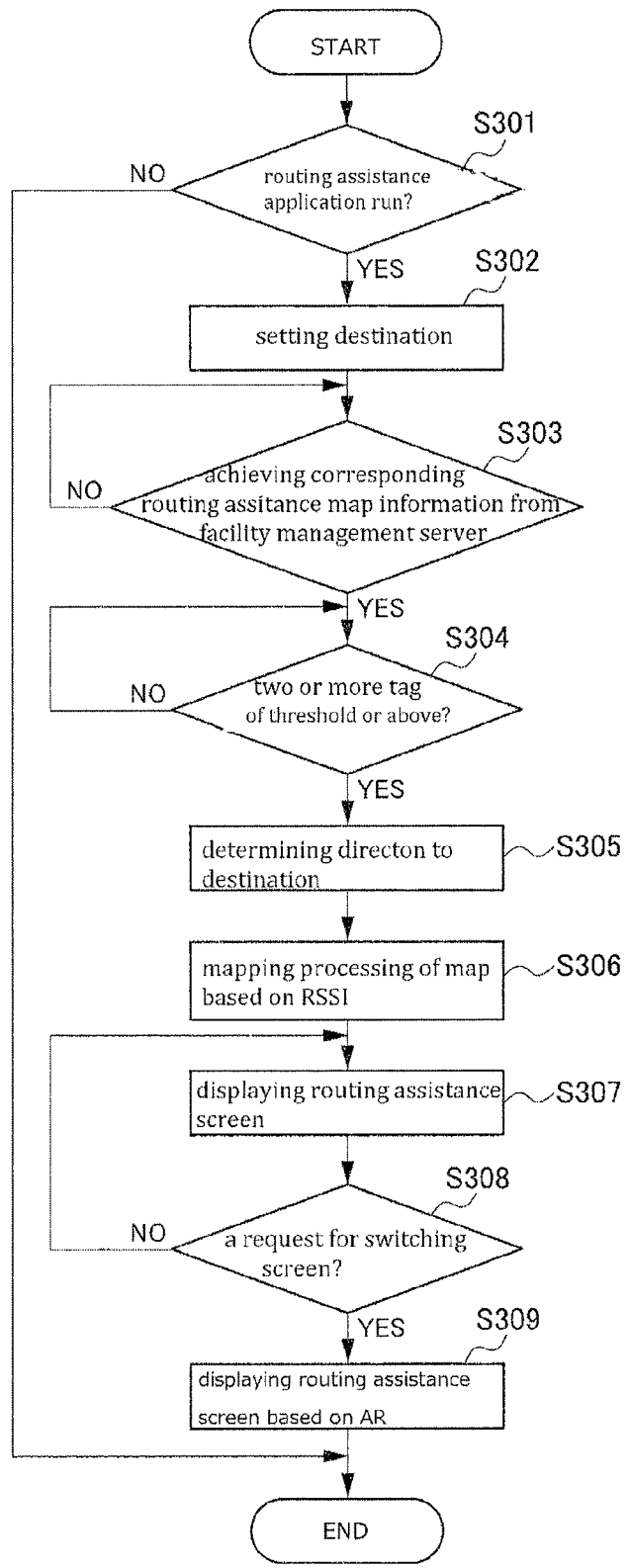
FIG. 9 is a flow chart showing a procedure of a routing assistance application using a location information service system in accordance with a first embodiment of the present invention.
Figure 10:
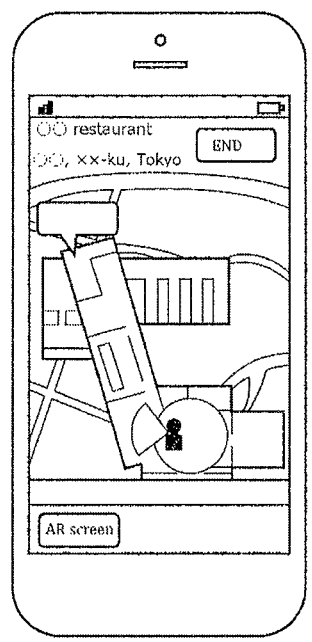
FIG. 10 shows an exemplary screen created by a routing assistance application in accordance with a first embodiment of the present invention.
Figure 10:
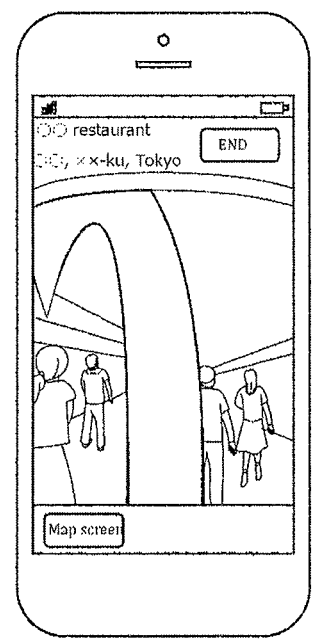

FIG. 9 is a flow chart showing a procedure of processing a routing assistance application using a location information service system in accordance with the embodiment of the present invention. FIG. 10 shows an exemplary screen created by a routing assistance application.

Further, the electronic tag transmitter 10 shall be mounted in each store of the commercial facility. First, a user runs a routing assistance application which is preliminarily installed in the portable information terminal 20 (Step S301). Subsequently, the user inputs a destination via the operating unit 230 of the portable information terminal 20 (Step S302). Once the destination is set, the application execution control unit 202 achieves corresponding or applicable routing assistance map information from the facility management server 40 (Step S303). Subsequently, the application execution control unit 202 receives radio waves from each of a plurality of the electronic tag transmitters 10 mounted in the commercial facility, and determines if there are two or more electronic tag transmitters 10 RSSI of which is the threshold or above (Step S304). Subsequently, the application execution control unit 202 determines a direction toward the destination based on the radio waves received from the electronic tag transmitters 10 RSSI of which is the threshold or above (Step S305), and performs a mapping process with the previously received map, based on RSSI (Step S306). For example, as shown in FIG. 10(*a*), a routing assistance screen is displayed on the display unit 240 (Step S307).

When the routing assistance (display mode) is intended to be switched to augmented reality (AR) (display mode), a request for switch is made by operating the operating unit of the portable information terminal 20 (Step S308), and a display screen is then switched from the routing assistance (display mode) to the augmented reality (display mode) (Step S309). In this regard, a conventional AR technologies may be used. For example, an superposed image in which surrounding facilities information achieved via communication from the server is superposed on the surrounding facilities information contained an image captured by an camera housed in the portable information terminal 20 is displayed on the display unit 240. In the embodiment, map information is displayed as facilities-associated information. However, instead of the map information, store information of the facilities arranged on a route may be displayed.

As the routing assistance application using the electronic tag transmitter 10 is performed without relying on a network environment, more exact location can be specified in comparison to a routing assistance based on GPS. Furthermore, as necessary information is delivered to the portable information terminal 20 such as a smartphone carried by the user, smooth guidance to the destination can be realized. Furthermore, the portable information terminal 20 can be switched from the map display mode to AR display mode and vice versa, thereby allowing the map to be mapped to real world. Due to this, geographical information to the destination can be provided in a comprehensible fashion.

A Second Embodiment

Figure 11:
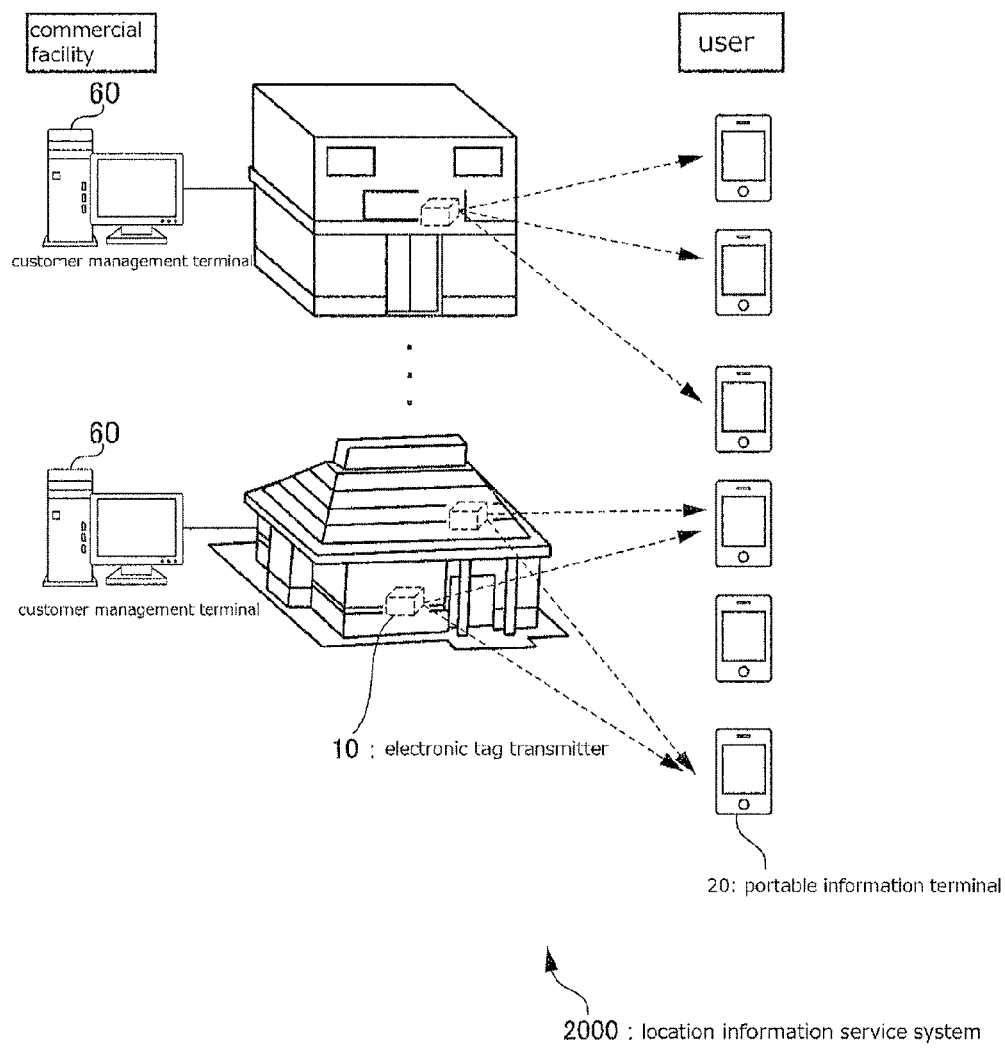
FIG. 11 shows a configuration of a location information service system in accordance with a second embodiment of the present invention.
Figure 12:
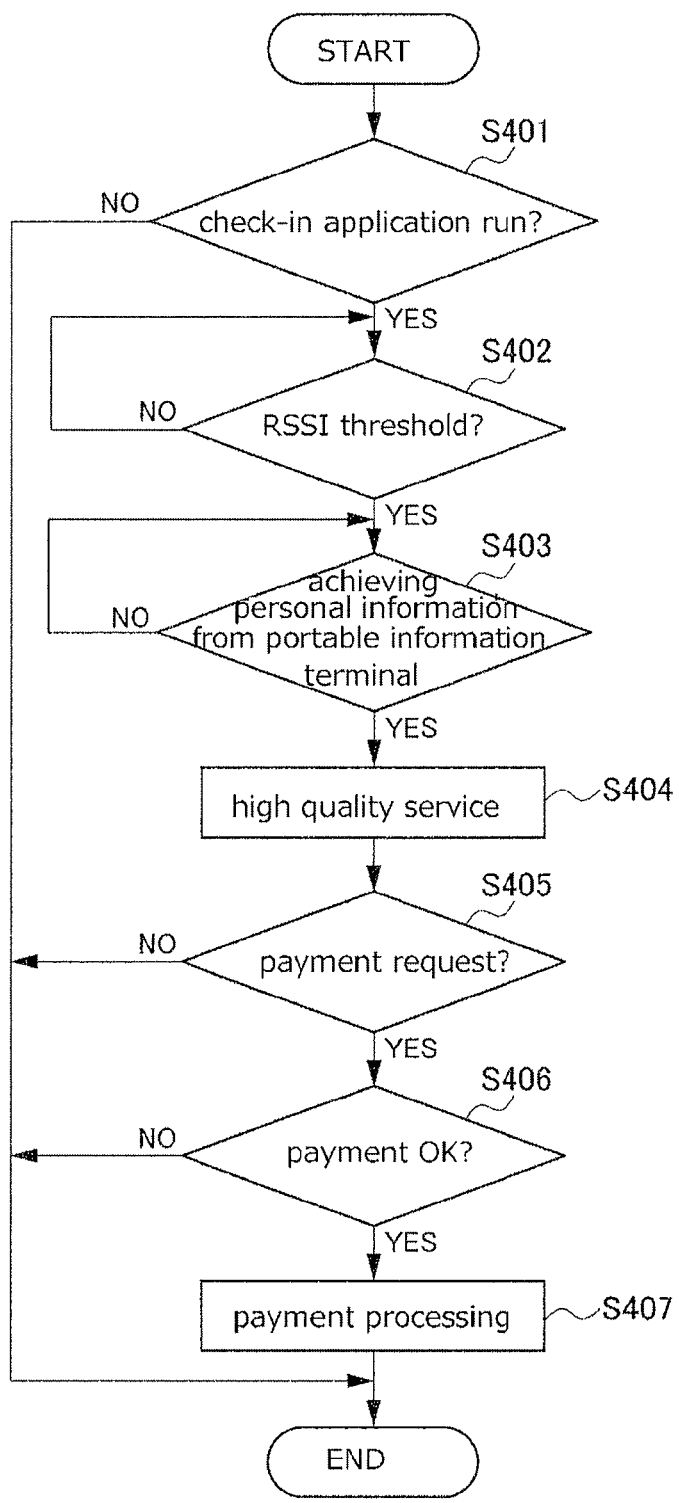
FIG. 12 shows a procedure of a check-in application and a payment application using a location information service system in accordance with a second embodiment of the present invention.

Next, a location information service system 2000 in accordance with a second embodiment of the present invention will be hereinafter described. Referring to FIG. 11, the location information service system 2000 in accordance with the second embodiment is provided with one or more electronic tag transmitter 10 mounted in an arbitrary location of commercial facility, at least one portable information terminal 20 such as a smartphone, and etc., and a customer management terminal 60 mounted in the commercial facility having the electronic tag transmitter 10 mounted therein.

The second embodiment will be described with respect to the point(s) different from the first embodiment, and detailed explanation with respect to the point(s) identical to the first embodiment will be thus omitted. In the above-mentioned configuration, the electronic tag transmitter 10 broadcasts a first identification information via radio waves such that a (common) application which is executed in common by the portable information terminal 20 is specified. The portable information terminal 20 transmits the first identification information that the portable information terminal 20 itself receives and personal information registered in the memory unit 210 to the customer management terminal 60. Accordingly, the customer terminal 60 registers the first identification information and the personal information in a memory unit (not shown), and provides facility service based on the first identification information and the personal information. (Application Case Example in the Second Embodiment)

Hereinafter, an application case example of the location information service system in accordance with the second embodiment of the present invention will be explained. Furthermore, personal information of a user who carries the portable information terminal 20 is preliminarily registered with his/her own portable information terminal 20. As shown in FIG. 8(*a*), the user (customer) carrying the portable information terminal 20 preliminarily runs the check-in application before entering the store (Step S401). The application execution control unit 202 compares RSSI of the radio waves as measured by the radio wave intensity measure unit 203 with a predetermined RSSI as a threshold. If the RSSI of the received radio waves is the predetermined threshold or above, the application execution control unit 202 transmits the radio wave information via the predetermined network to the customer management terminal 60.

Based on the radio wave information received, the customer management terminal 60 determines or judges that the customer came into or entered the store (Step S402). Subsequently, the portable information terminal 20 transmits his/her own personal information (e. g., ID, a name, a head-and-shoulders photo) to the customer management terminal 60 (Step S403). The transmission in this step (Step S403) may be performed at the same timing as Step S402. The customer management terminal 60 having received the personal information displays, for example "ID: 012345, Ms. Hanako Yamada, entering (the store) at 12:30, Check-in" as shown in FIG. 8(*b*). Since a sales staff having checked the personal information can know the customer's name and face before meeting or servicing the customer, he/she provides the customer with a high quality service (i.e., executive service) such as talking to the customer with the name (Step S404).

Next, a procedure of payment will be described. The portable information terminal 20 may be provided with a function of electronic money for payment, and cash may be preliminarily deposited in the portable information terminal 20. The user operates the portable information terminal 20, and issues a request for payment processing (Step S405). The application execution control unit 202 performs a certification of payment processing by reading electronic payment information registered in the memory unit 210 of the portable information terminal 20 (Step S406). Upon receiving the request for payment from the portable information terminal 20, the customer management terminal 60 adds the electronic payment information to the personal information obtained by check-in determination (judgment), thereby calculating a total amount spent from the check-in until the payment, and transmitting the result of the calculation to the portable information terminal 20. For example, as shown in FIG. 8(*c*), payment-associated content (screen) is displayed on the portable information terminal 20 of the user. The user having confirmed or checked the payment-associated content presses a button of "execute", or approaching a receiving terminal (now shown) suited for electronic money mounted in the facility, thereby performing the payment processing (Step S407). The receiving terminal suited for electronic money may be housed in the customer management terminal 60 or externally connected to the customer management terminal 60.

According to the application using the location information service system in accordance with the afore-mentioned second embodiment of the present invention, the check-in determination and the payment is performed inside the facility without using any server via network, thereby allowing for smooth payment processing on a facility bases.

(Application Case Example in Accordance with the First Embodiment and Other Application Case Example(s) in Accordance with the Second Embodiment)

Regarding the location information service system 1000 in accordance with the first embodiment and the location information service system 2000 in accordance with the second embodiment, there is also provided a further application case example that the electronic tag transmitter 10 is mounted on each floor in the facility such as a department store and a large shopping mall, and a user who carries the portable information terminal 20 can check a guide plate of each floor. This application case example can be employed underground, which has been conventionally considered difficult to realize. Similarly, this application case example can be employed in a shopping mall. In this case, the electronic tag transmitter 10 is mounted in each store. As the user heads out to the store, information on a sale, recommended goods, a coupon, and etc. continue to be displayed on the screen of the portable information terminal 20. In this case, the user can obtain required information only by running the application, thereby enhancing the convenience of the user.

Moreover, the electronic tag transmitter 10 may be mounted in a digital signage or a vending machine. In this case, a notice linked with an advertisement and a pinpoint information transmission are possible. A user can find where a bending machine is. Furthermore, it may be considered for a user to find congestion situation and to make use of waiting time at an amusement attraction facility or store. In this case, a user in the queue may be provided with a service to kill time or an advertisement. The service which can be provide only at such a place even in the waiting time can create an additional value. Moreover, it may be used for guidance in facilities such as an art museum, a museum, a zoo, and etc. In this case, a detailed explanation can be given to the user via the portable information terminal 20, which can be realized by mounting the electronic tag transmitter 10 in each area of the above facilities.

The electronic tag transmitter 10 may be mounted in public facilities such as a bus and an electric railcar. In this case, since the bus and electric railcar on which a user is can be specified, the user carrying the portable information terminal 20 can be provided with an information on this stop, time the user's trip to the destination, and etc. The user can specify a vehicle only by running the application, thereby enjoying more exact and abundant information. The electronic tag transmitter 10 may be employed in a stamp rally or an attraction. The electronic tag transmitter 10 which is employed in a game such as a treasure hunting and stamp rally to place a check mark or issue password can add depth to the game. The location information service system 1000 in accordance with the first embodiment and the location information service system 2000 in accordance with the second embodiment can precisely capture the range of from 10 m to 100 m, thereby acting as a clue tool, which cannot be realized by GPS.

Moreover, the electronic tag transmitter 10 can be introduced into a moving body such as a human and a pet. In this case, a current specific information on the moving body such as the human and the pet can be transmitted to a user carrying the portable information terminal 20, which can be performed by distributing a variety of information around. The user can check a name, sex, age, and photograph of a pet hanging around only by running the application.

(Effect of the First Embodiment)

According to the location information service system 1000, the portable information terminal 20 is configured to execute the application specified by the first identification information as received. For this reason, the application can be controlled without relying on GPS or network environment. Desired information can be displayed on the screen of the portable information terminal only by running the application. For the above reasons, the application can be easily realized such that an electronic coupon can be distributed indoor commercial facility where GPS radio waves cannot be received; as one approaching a digital signage, information is displayed; as one approaching an exhibit in an art museum, a playback of audio explanation about the exhibit is performed; or a moving body such as a human and a pet carrying the electronic tag transmitter can continue to distribute information around even during movement.

In the location information service system 1000 in accordance with the first embodiment of the present invention, the portable information terminal 20 queries the business operator management server 50 (i.e., management server), thereby achieving the application identification information (i.e., the second identification information) assigned thereto based on the management equipment number (i.e., the first identification information) which is broadcast by the electronic tag transmitter 10. Accordingly, the portable information terminal 20 can execute the common application due to the management equipment number (i.e., the first identification information). Furthermore, the portable information terminal 20, which can refer to the correspondence table stored in the memory unit 210, does not need to query the business operator management server 50 (i.e. management device) in each case, thereby reducing communication traffic and communication cost. The portable information terminal 20 can measure the radio wave intensity of the radio waves which the electronic tag transmitter 10 transmits, and execute the application, which varies depending on the radio wave intensity as measured. As a result, more flexible check-in service that before entering the store, information is provided, and after entering the store, point service is provided can be provided, for example, by executing the different application.

In the location information service system 1000 in accordance with the first embodiment of the present invention, the electronic tag transmitter 10 encodes the management equipment number (i.e., the first identification information) in at least one encoding pattern, and transmits the encoded management equipment number together with the type of the encoding pattern. Accordingly, the portable information terminal 20 can decode the encoded management equipment number. As such, information transmitting and receiving with high level of security can be realized. Furthermore, while the electronic tag transmitter 10 transmits the management equipment number (i.e., the first identification information) in a cycle of n seconds, a cycle of m seconds (n>m) shifted is randomly inserted to the cycle of n seconds. As a result, a risk that radio waves are simultaneously transmitted by a plurality of electronic tag transmitters 10 and one portable information terminal 20 receiving the radio waves cannot get the service can be avoided.

In the location information service system 100 in accordance with the first embodiment of the present invention, when the check-in application is run and radio waves received from the electronic tag transmitter 10 reach the predetermined radio wave intensity, the information on the radio wave intensity is transmitted to the facility management device 40. The facility management device 40 makes a check-in determination (judgment) based on the information on the radio wave intensity, and achieves the personal information specified by the first identification information and the second identification information to display the personal information on the screen. For the above reasons, as a sales staff can find not only whether or not a customer enters the store but, the customer's name and face before meeting or servicing the customer, he/she provides the customer with a high quality service. The facility management device 40 having received the request from the portable information terminal 20 communicates with the management device 50, achieves information associated with the electronic payment from the management device 50, adds the personal information obtained by check-in determination to the information associated with the electronic payment, thereby executing the electronic payment processing. As a result, more smooth electronic payment processing can be performed without any presentation of cash or a credit card.

In the location information service system 1000 in accordance with the first embodiment of the present invention, when the routing assistance application is run, and the facility as the destination is set, the portable information terminal 20 achieves the information associated with the facility from the facility management device 40, displays the information associated with the facility corresponding to the current location in line with the advancing direction, determines a direction toward the destination based on the radio wave intensity of radio waves transmitted by the plurality of electronic tag transmitters 10, and displays the routing assistance to the destination on the screen. As such, the location information service system 1000 does not rely on the network environment, and can thus more exactly specify the location in comparison to the routing assistance based on GPS. As necessary information is delivered to the portable information terminal 20 such as smartphone carried by the user, smooth guidance to the destination can be realized. Furthermore, upon receiving a request for switching the screen, the portable information terminal 20 switches the screen from the routing assistance display mode to the augmented reality display mode, thereby allowing the map to be mapped to real world. Due to this, geographical information to the destination can be provided in a comprehensible fashion.

In the location information service system 2000 in accordance with the second embodiment of the present invention, when the check-in application is run and radio waves received from the electronic tag transmitter 10 reach the predetermined radio wave intensity, the portable information terminal 20 transmits the information on the radio wave intensity to the customer management terminal 60. The customer management terminal 60 makes a check-in determination based on the information on the radio wave intensity, achieves the personal information from the portable information terminal 20, and displays the personal information as achieved on the screen. Furthermore, upon receiving a request from the portable information terminal 20, the customer management terminal 60 achieves the information associated with the electronic payment from the portable information terminal 20, adds the personal information obtained by check-in determination (judgment), and executes the electronic payment processing. In this case, any server via the network is not used and smooth payment processing on a facility basis can be realized.

Furthermore, the location information service method employing an electronic tag in accordance with the first embodiment of the present invention can be used in, for example, the location information service system 1000, which is provided with one or more electronic tag transmitter 10, the management device (i.e., the business operator management server 50) run and managed by the location information service-providing business operator, and a plurality of portable information terminals 20 connected via the network (i.e., the mobile network 30) to the management device, as shown in FIG. 1. The above method has the steps of: the electronic tag transmitter 10's broadcasting via radio waves the first identification information (i.e., the management equipment number) specifying an application which is executed in common by the portable information terminals 20; the management device (i.e., the business operator management server 50)'s receiving the inquiry based on the first identification information (i.e., the management equipment number) which is received by the portable information terminal 20, transforming the first identification information (i.e., management equipment number) into the second identification information (i.e., application identification information) which is to be managed by the portable information terminal, and transmitting the second identification information (i.e., the application identification information) to the portable information terminal 20 having made the inquiry; and the portable information terminal 20's executing the application based on the second identification information (i.e., application identification information) to receive the facility information or the associated service.

In accordance with the location information service method employing the electronic tag in accordance with the first embodiment of the present invention, the electronic tag transmitter 10 broadcasts via radio waves the first identification information (i.e., the management equipment number) specifying an application which is executed in common by the portable information terminal(s) 20, and the portable information terminal 20 executes the application specified based on the second identification information (i.e., the application identification information) achieved from the management device (i.e., the business operator management server 50). Due to the above configuration, the portable information terminal 20 can control the application without relying on GPS or network environment, and a desired information can be displayed on the screen of the portable information terminal 20 only by a user's running the application. For the above reasons, the location information service method employing the electronic tag can be easily provided such that an electronic coupon can be distributed indoor commercial facility where GPS radio waves cannot be received; as one approaching a digital signage, information is displayed; or as one approaching an exhibit in an art museum, a playback of audio explanation about the exhibit is performed.

The portable information terminal 20 in accordance with the first embodiment of the present invention is connected via the network (i.e., the mobile network 30) to a management device (i.e., the business operator management server 50), as shown in, for example, FIG. 1. The portable information terminal 20 is provided with the identification information recognizing unit 201 receiving and recognizing the first identification information (i.e., the management equipment number) which specifies the application that is executed in common by the one or more portable information terminal 20 and is broadcast via radio waves by an electronic tag transmitter 10, and an application execution control unit 202 querying the management device (i.e., the business operator management server 50) based on the first identification information (i.e., the management equipment number) recognized, achieving the second identification information (i.e., the application identification information), into which the management device (i.e., the business operator management server 50) transforms the first identification information (i.e., the management equipment number) and which is transmitted by the management device (i.e., the business operator management server 50), and executing the corresponding application based on the second identification information (i.e., the application identification information) as achieved.

In the portable information terminal 20 in accordance with the first embodiment of the present invention, the application execution control unit 202 is configured to execute the corresponding application program based on the second identification information (i.e., the application identification information), into which the management device (i.e., the business operator management server 50) transforms the first identification information (i.e., the management equipment number) and which is transmitted by the management device (i.e., the business operator management server 50). Due to the above configuration, the portable information terminal 20 can control the application without relying on GPS or network environment, and a desired information can be displayed on the screen of the portable information terminal 20 only by a user's running the application. For the above reasons, the application can be used in the portable information terminal 20 such that an electronic coupon can be distributed indoor commercial facility where GPS radio waves cannot be received; as one approaching a digital signage, information is displayed; or as one approaching an exhibit in an art museum, a playback of audio explanation about the exhibit is performed.

Figure 5:
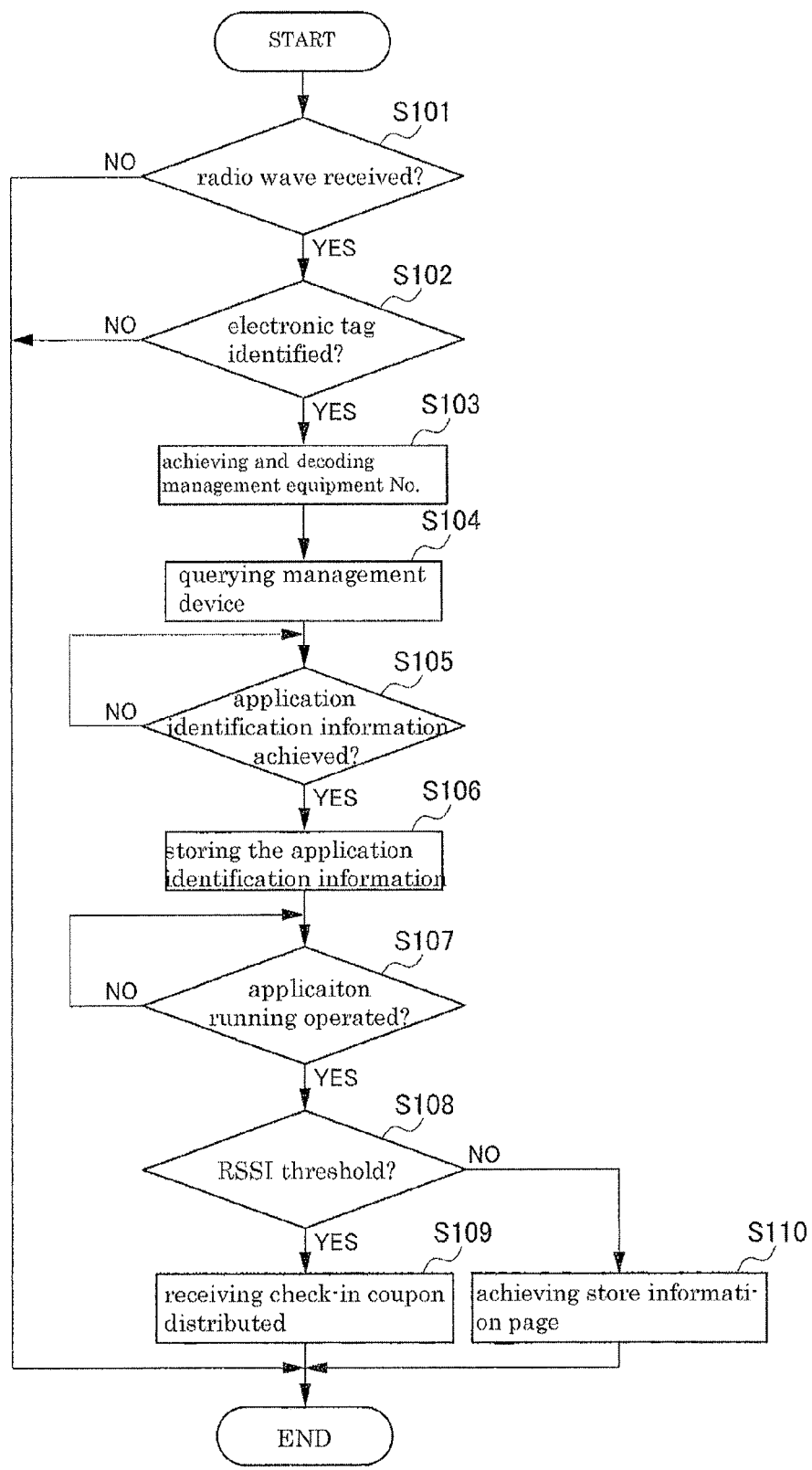
FIG. 5 is a flow chart showing an operation of a portable information terminal in accordance with a first embodiment of the present invention.

A terminal program in accordance with the first embodiment of the present invention causes a computer of the portable information terminal 20 connected to via the network (i.e., the mobile network 30) to the management device (i.e., the business operator management server 50) to perform: a processing of receiving and recognizing the first identification information which specifies the application that is executed in common by one or more portable information terminal 20 and is broadcast via radio waves by an electronic tag transmitter 10 (S101-S103), and a processing of querying the management device based on the first identification information recognized, receiving the second identification information, into which the management device transforms the first identification information and which is transmitted by the management device, and executing the corresponding application based on the second identification information received (S104-S110), as shown in, for example, FIG. 5.

In the terminal program in accordance with the first embodiment of the present invention, the portable information terminal 20 sequentially reads and executes the aforementioned terminal program. For the above configuration, the portable information terminal 20 executes the corresponding application based on the second identification information (i.e., the application identification information), into which the management device (i.e., the business operator management server 50) transforms the first identification information (i.e., the management equipment number) and which is transmitted by the management device (i.e., the business operator management server 50). Due to the above configuration, the portable information terminal 20 can control the application without relying on GPS or network environment, and a desired information can be displayed on the screen of the portable information terminal 20 only by a user's running the application. For the above reasons, the application can be used in the portable information terminal 20 such that an electronic coupon can be distributed indoor commercial facility where GPS radio waves cannot be received; as one approaching a digital signage, information is displayed; or as one approaching an exhibit in an art museum, a playback of audio explanation about the exhibit is performed.

While a preferred embodiment of the present invention has been shown and described with particularity, it will be appreciated that various changes and modifications may suggest themselves to one having ordinary skill in the art upon being apprised of the present invention. It is also intended to encompass all such changes and modifications as fall within the scope and spirit of the appended claims

REFERENCE SIGNS LIST 10 electronic tag transmitter
20 portable information terminal
30 mobile network
40 facility management server (facility management device)

50 business operator management server (management device)
60 customer management terminal
1000, 2000 location information service system
200 control
202 application execution control unit
203 radio wave intensity measure unit
210 memory unit
220 communication unit
230 operating unit
240 display unit
250 near field communication unit

The invention claimed is:

1. A location information service system, comprising:
at least one electronic tag transmitter configured to transmit radio waves containing a first identification information; and
at least one portable information terminal configured to:
receive the first identification information, and
execute an application specified by the first identification information, wherein:
the portable information terminal measures a radio wave intensity of the radio waves transmitted by the electronic tag transmitter, and executes the application that varies depending on the radio wave intensity,
the electronic tag transmitter transmits the first identification information at a cycle of n second(s), and
a cycle of m second(s) shifted (n>m) is randomly inserted to the cycle of n second(s).

2. A location information service system, comprising:
at least one electronic tag transmitter configured to transmit radio waves containing a first identification information,
at least one portable information terminal configured to receive the first identification information and execute an application specified by the first identification information,
a management device, the management device being configured to receive an inquiry based on the first identification information received by the portable information terminal; transform the first identification information into a second identification information which is to be managed by the portable information terminal; and transmit the second identification to the portable information terminal having made the inquiry, and
a facility management device connected via a network to the portable information terminal, and run and managed by the facility,
wherein the portable information terminal is configured to execute the application based on the second identification information, wherein when a check-in application is run, and the radio waves received from the electronic tag transmitter reach a predetermined radio wave intensity, an information on the radio wave intensity is transmitted to the facility management device, and
wherein the facility management device makes a check-in determination based on the information on the radio wave intensity; achieves a personal information specified by the first identification information and the second identification information from the management device; and displays the personal information on a screen.

3. The location information service system according to claim 2, wherein upon receiving a request from the portable information terminal, the facility management device communicates with the management device; achieves an information associated with an electronic payment from the management device; adds the information associated with the electronic payment to the personal information obtained by the check-in determination, and executes an electronic payment processing.

4. A location information service system, comprising:
at least one electronic tag transmitter configured to transmit radio waves containing a first identification information;
at least one portable information terminal configured to:
receive the first identification information, and execute an application specified by the first identification information; wherein the portable information terminal measures a radio wave intensity of the radio waves transmitted by the electronic tag transmitter, and executes the application that varies depending on the radio wave intensity;
a management device, the management device being configured to receive an inquiry based on the first identification information received by the portable information terminal; transform the first identification information into a second identification information which is to be managed by the portable information terminal; and transmit the second identification information to the portable information terminal having made the inquiry, wherein the portable information terminal is configured to execute the application based on the second identification information, and
a facility management device connected via a network to the portable information terminal, and run and managed by the facility, wherein when a routing assistance application is run, and a facility as a destination is set, the portable information terminal achieves an information associated with the facility from the facility management device; displays on a screen an information associated with the facility corresponding to a current location in line with an advancing direction; determines a direction to the destination based on a radio wave intensity of the radio waves which are transmitted by a plurality of the electronic tag transmitters; and displays a routing assistance to the destination on a screen.

5. The location information service system according to claim 4, wherein upon receiving a request for switching the screen, the portable information terminal switches the screen from the routing assistance display mode to an augmented reality display mode.

6. A location information service method employing an electronic tag in a location information service system provided with at least one electronic tag transmitter configured to transmit radio waves containing a first identification information, a management device run and managed by a location information service-providing business operator, and a plurality of portable information terminals connected via a network to the management device and configured to receive the first identification information and execute an application specified by the first identification information, comprising the steps of:
the electronic tag transmitter's broadcasting the first identification information via radio waves, the first identification information specifying an application which is executed in common by the portable information terminal,
the management device's receiving an inquiry based on the first identification information which is received by the portable information terminal; transforming the first identification information into a second identification information which is to be managed by the portable information terminal; and transmitting the second identification information to the portable information terminal having made the inquiry, and the portable information terminal's executing the application based on the second identification information, wherein the portable information terminal measures a radio wave intensity of the radio waves transmitted by the electronic tag transmitter, and executes the application that varies depending on the radio wave intensity.

7. A portable information terminal connected via a network to a management device, comprising:
an identification information recognizing unit receiving and recognizing a first identification information which specifies an application that is executed in common by at least one portable information terminal and is broadcast via radio waves by an electronic tag transmitter configured to transmit radio waves containing the first identification information, and
an application execution control unit querying the management device based on the first identification information recognized; achieving a second identification information, into which the management device transforms the first identification information, and which is transmitted by the management device; and executing a corresponding application based on the second identification information achieved, wherein the portable information terminal measures a radio wave intensity of the radio waves transmitted by the electronic tag transmitter, and executes the application that varies depending on the radio wave intensity.

8. A non-transitory computer readable medium storing a terminal program, which causes a computer of a portable information terminal connected to via a network to a management device to perform:
a processing of receiving and recognizing a first identification information which specifies an application that is executed in common by at least one portable information terminal and is broadcast via radio waves by an electronic tag transmitter configured to transmit radio waves containing the first identification information, and a processing of querying the management device based on the first identification information recognized;
receiving a second identification information, into which the management device transforms the first identification information and which is transmitted by the management device; and
executing a corresponding application based on the second identification information received, wherein the portable information terminal measures a radio wave intensity of the radio waves transmitted by the electronic tag transmitter, and executes the application that varies depending on the radio wave intensity.

9. A location information service method employing an electronic tag in a location information service system provided with at least one electronic tag transmitter configured to transmit radio waves containing a first identification information, a management device run and managed by a location information service-providing business operator, a plurality of portable information terminals connected via a network to the management device and configured to receive the first identification information and execute an application specified by the first identification information, and a customer management terminal mounted in a facility having the electronic tag transmitter mounted therein comprising the steps of:

the electronic tag transmitter's broadcasting the first identification information via radio waves, the first identification information specifying an application which is executed in common by the portable information terminal, the management device's receiving an inquiry based on the first identification information which is received by the portable information terminal; transforming the first identification information into a second identification information which is to be managed by the portable information terminal; and transmitting the second identification information to the portable information terminal having made the inquiry, and the portable information terminal's executing the application based on the second identification information, wherein when a check-in application as the application is run, and the radio waves received from the electronic tag transmitter reach a predetermined radio wave intensity, the portable information terminal transmits an information on the radio wave intensity to the customer management terminal, and wherein the customer management terminal makes a check-in determination based on the information on the radio wave intensity; achieves a personal information from the portable information terminal; and displays the personal information on a screen.

10. A portable information terminal connected via a network to a management device, comprising:
an identification information recognizing unit receiving and recognizing a first identification information which specifies an application that is executed in common by at least one portable information terminal and is broadcast via radio waves by an electronic tag transmitter configured to transmit radio waves containing the first identification information, and
an application execution control unit querying the management device based on the first identification information recognized; achieving a second identification information, into which the management device transforms the first identification information, and which is transmitted by the management device; and executing a corresponding application based on the second identification information achieved, wherein when a check-in application as the application is run, and the radio waves received from the electronic tag transmitter reach a predetermined radio wave intensity, the portable information terminal transmits an information on the radio wave intensity to the customer management terminal, and wherein the customer management terminal makes a check-in determination based on the information on the radio wave intensity; achieves a personal information from the portable information terminal; and displays the personal information on a screen.

11. A non-transitory computer readable medium storing a terminal program, which causes a computer of a portable information terminal connected to via a network to a management device to perform:
a processing of receiving and recognizing a first identification information which specifies an application that is executed in common by at least one portable information terminal and is broadcast via radio waves by an electronic tag transmitter configured to transmit radio waves containing the first identification information, and
a processing of querying the management device based on the first identification information recognized;

receiving a second identification information, into which the management device transforms the first identification information and which is transmitted by the management device; and executing a corresponding application based on the second identification information received, wherein when a check-in application as the application is run, and the radio waves received from the electronic tag transmitter reach a predetermined radio wave intensity, the portable information terminal transmits an information on the radio wave intensity to the customer management terminal, and wherein the customer management terminal makes a check-in determination based on the information on the radio wave intensity; achieves a personal information from the portable information terminal; and displays the personal information on a screen.

12. A location information service method employing an electronic tag in a location information service system provided with at least one electronic tag transmitter configured to transmit radio waves containing a first identification information, and a portable information terminal connected via a network to a management device managing a location information, and configured to receive the first identification information and execute a terminal program based on the first identification information, comprising the steps of:
the management device's receiving an inquiry based on the first identification information which is received by the portable information terminal; transforming the first identification information into a second identification information which is to be managed by the portable information terminal; and transmitting the second identification information to the portable information terminal having made the inquiry, and
the portable information terminal's executing the terminal program based on the second identification information, wherein the portable information terminal measures a radio wave intensity of the radio waves transmitted by the electronic tag transmitter to switch between a first screen mode and a second screen mode based on the radio wave intensity.

13. A portable information terminal connected via a network to a management device, comprising:
an identification information recognizing unit receiving and recognizing a first identification information for executing a terminal program from at least one electronic tag transmitter configured to transmit radio waves containing the first identification information, and
a control unit querying the management device based on the first identification information recognized; achieving a second identification information, into which the management device transforms the first identification information, and which is transmitted by the management device; and executing the terminal program based on the second identification information achieved, wherein control unit measures a radio wave intensity of the radio waves transmitted by the electronic tag transmitter to switch between a first screen mode and a second screen mode based on the radio wave intensity.

14. A non-transitory computer readable medium storing a terminal program, which causes a computer of a portable information terminal connected to via a network to a management device to perform:
a processing of receiving and recognizing a first identification information for executing a terminal program from at least one electronic tag transmitter configured to transmit radio waves containing the first identification information,
a processing of querying the management device based on the first identification information recognized; receiving a second identification information, into which the management device transforms the first identification information, and which is transmitted by the management device; and executing the terminal program based on the second identification information received, and
a processing of measuring a radio wave intensity of the radio waves transmitted by the electronic tag transmitter to switch between a first screen mode and a second screen mode based on the radio wave intensity.

15. A location information service system, comprising:
at least one electronic tag transmitter configured to transmit radio waves containing a first identification information, and
at least one portable information terminal configured to:
receive the first identification information, and
execute an application specified by the first identification information, wherein:
the portable information terminal measures a radio wave intensity of the radio waves transmitted by the electronic tag transmitter, and executes the application that varies depending on the radio wave intensity,
in the event that there is a plurality of the portable information terminals, the electronic tag transmitter is configured to broadcast the first identification information such that the application executed in common by the plurality of the portable information terminals is specified,
the electronic tag transmitter basically transmits the first identification information at a cycle of n second(s), and
a cycle of m second(s) shifted (n>m) is randomly inserted to the cycle of n second(s).

16. A location information service system, comprising:
at least one electronic tag transmitter configured to transmit radio waves containing a first identification information; and
at least one portable information terminal configured to:
receive the first identification information, and
execute an application specified by the first identification information, wherein:
the portable information terminal measures a radio wave intensity of the radio waves transmitted by the electronic tag transmitter, and executes the application that varies depending on the radio wave intensity,
the electronic tag transmitter encodes the first identification information in at least one encoding pattern, and adds a type of the encoding pattern to the first identification information encoded to transmit the encoded first identification information with the type of the encoding pattern added, and
the electronic tag transmitter basically transmits the first identification information at a cycle of n second(s), and wherein a cycle of m second(s) shifted (n>m) is randomly inserted to the cycle of n second(s).

17. A location information service system, comprising:
at least one electronic tag transmitter configured to transmit radio waves containing a first identification information, and
at least one portable information terminal configured to:
receive the first identification information, and execute an application specified by the first identification information, wherein:

the portable information terminal measures a radio wave intensity of the radio waves transmitted by the electronic tag transmitter, and executes the application that varies depending on the radio wave intensity, in the event that there is a plurality of the portable information terminals, the electronic tag transmitter is configured to broadcast the first identification information such that the application executed in common by the plurality of the portable information terminals is specified, and the electronic tag transmitter encodes the first identification information in at least one encoding pattern, and adds a type of the encoding pattern to the first identification information encoded to transmit the encoded first identification information with the type of the encoding pattern added, and the electronic tag transmitter basically transmits the first identification information at a cycle of n second(s), and wherein a cycle of m second(s) shifted (n>m) is randomly inserted to the cycle of n second(s).

18. A location information service system, comprising:

at least one electronic tag transmitter configured to transmit radio waves containing a first identification information, at least one portable information terminal configured to receive the first identification information and execute an application specified by the first identification information, wherein: the portable information terminal measures a radio wave intensity of the radio waves transmitted by the electronic tag transmitter, and executes the application varying depending on the radio wave intensity; and in the event that there is a plurality of the portable information terminals, the electronic tag transmitter is configured to broadcast the first identification information such that the application which is executed in common by the plurality of the portable information terminals is specified, a management device, the management device being configured to receive an inquiry based on the first identification information received by the portable information terminal; transform the first identification information into a second identification information which is to be managed by the portable information terminal; and transmit the second identification information to the portable information terminal having made the inquiry, wherein: the portable information terminal is configured to execute the application based on the second identification information, and a facility management device connected via a network to the portable information terminal, and run and managed by the facility, wherein: when a routing assistance application is run, and a facility as a destination is set, the portable information terminal achieves an information associated with the facility from the facility management device; displays on a screen an information associated with the facility corresponding to a current location in line with an advancing direction; determines a direction to the destination based on a radio wave intensity of the radio waves which are transmitted by a plurality of the electronic tag transmitters; and displays a routing assistance to the destination on a screen.

19. The location information service system according to claim 18, wherein upon receiving a request for switching the screen, the portable information terminal switches the screen from the routing assistance display mode to an augmented reality display mode.

* * * * *